United States Patent
Liao et al.

(10) Patent No.: US 9,688,813 B2
(45) Date of Patent: Jun. 27, 2017

(54) THERMOPLASTIC POLYESTER ELASTOMER AND METHOD FOR MANUFACTURING THE SAME

(71) Applicant: INDUSTRIAL TECHNOLOGY RESEARCH INSTITUTE, Hsinchu (TW)

(72) Inventors: Chun-Hsiung Liao, New Taipei (TW); Jen-Chun Chiu, Pingtung (TW); Cing-Jiuh Kang, Hsinchu (TW); Chung-Cheng Lin, Kaohsiung (TW); Chin-Lang Wu, Tongsiao Township (TW); Yu-Chuan Hsu, Hsinchu (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 0 days.

(21) Appl. No.: 14/582,793

(22) Filed: Dec. 24, 2014

(65) Prior Publication Data
US 2016/0130393 A1    May 12, 2016

(30) Foreign Application Priority Data

Nov. 10, 2014 (TW) ............................. 103138869 A

(51) Int. Cl.
C08G 63/91 (2006.01)
(52) U.S. Cl.
CPC ................................. *C08G 63/916* (2013.01)
(58) Field of Classification Search
CPC ........ C08L 67/02; C08G 63/916; C08G 59/18
See application file for complete search history.

(56) References Cited

U.S. PATENT DOCUMENTS

| 5,733,986 | A * | 3/1998 | Senda ................ C08G 18/4252 524/109 |
| 6,037,423 | A * | 3/2000 | Nagano .................. C08G 63/60 524/86 |
| 6,663,929 | B1 * | 12/2003 | Tabota ................ B29B 17/0036 428/207 |
| 2002/0098363 | A1 | 7/2002 | Sakamoto et al. |
| 2003/0040554 | A1 | 2/2003 | Nakanishi et al. |
| 2003/0125479 | A1 | 7/2003 | Kinsho et al. |
| 2003/0220444 | A1 | 11/2003 | Furuta et al. |
| 2004/0041355 | A1 * | 3/2004 | Suzuki .................. B65D 53/02 277/650 |
| 2004/0096683 | A1 | 5/2004 | Ikeda et al. |
| 2005/0031871 | A1 | 2/2005 | Kinsho et al. |
| 2005/0064313 | A1 | 3/2005 | Kishiki et al. |
| 2005/0147778 | A1 | 7/2005 | Tai et al. |
| 2005/0164113 | A1 | 7/2005 | Iwata |
| 2007/0015851 | A1 | 1/2007 | Akutagawa et al. |
| 2007/0015852 | A1 | 1/2007 | Akutagawa et al. |
| 2008/0085947 | A1 | 4/2008 | Ward et al. |
| 2009/0123186 | A1 | 5/2009 | Sugiura et al. |
| 2009/0253827 | A1 | 10/2009 | Mukai et al. |
| 2009/0264578 | A1 | 10/2009 | Minaki et al. |
| 2009/0280423 | A1 | 11/2009 | Yahiro et al. |
| 2010/0221655 | A1 | 9/2010 | Mukai et al. |
| 2010/0316944 | A1 | 12/2010 | Nakajima et al. |
| 2011/0020741 | A1 | 1/2011 | Mizumori et al. |
| 2011/0104608 | A1 | 5/2011 | Nakajima et al. |
| 2011/0269874 | A1 | 11/2011 | Mukai et al. |
| 2011/0294955 | A1 | 12/2011 | Akiba |
| 2011/0306709 | A1 | 12/2011 | Torii et al. |
| 2013/0011657 | A1 | 1/2013 | Kato et al. |
| 2013/0020118 | A1 | 1/2013 | Ito et al. |
| 2013/0143155 | A1 | 6/2013 | Santo et al. |
| 2014/0087300 | A1 | 3/2014 | Uno et al. |
| 2014/0087302 | A1 | 3/2014 | Kim et al. |
| 2014/0087304 | A1 | 3/2014 | Uno et al. |

FOREIGN PATENT DOCUMENTS

| CN | 1167784 | A | 12/1997 |
| CN | 1910043 | A | 2/2007 |
| CN | 101608056 | A | 12/2009 |
| CN | 101687967 | A | 3/2010 |
| CN | 102060969 | A | 5/2011 |
| CN | 102115532 | A | 7/2011 |
| CN | 102471499 | A | 5/2012 |
| CN | 102477212 | A | 5/2012 |
| CN | 102786676 | A | 11/2012 |
| CN | 102964579 | A | 3/2013 |
| CN | 102993421 | A | 3/2013 |
| CN | 103012724 | A | 4/2013 |
| EP | 1578866 | B1 | 2/2011 |
| JP | 2000-143949 | A | 5/2000 |
| JP | 2011-207926 | A | 10/2011 |
| JP | 2012-107155 | A | 6/2012 |
| TW | 201245871 | A1 | 11/2012 |

OTHER PUBLICATIONS

Taiwanese Office Action and Search Report, issued Aug. 17, 2015, for Taiwanese Application No. 103138869.
Aravinthan et al., "Blends of Poly(ethylene terephthalate) and Poly(butylene terephthalate)," Journal of Applied Polymer Science, vol. 98, 2005, pp. 75-82.
Granado et al., "Preparation of Poly(ethylene terephthalate)/Poly(amino ether) Blends by means of the Addition of Poly(butylene terephthalate)," Macromolecular Materials and Engineering, vol. 289, 2004, pp. 997-1003.
Kiyotsukuri et al., "Poly(ethylene terephthalate) copolymers with a smaller amount of poly(ethylene glycol)s and polybutylene glycol)s," Polymer, vol. 36, No. 13, 1995, pp. 2629-2635.
Marchese et al., "Relationships between the Molecular Architecture, Crystallization Capacity, and Miscibility in Poly(butylene terephthalate)/Polycarbonate Blends: A Comparison with . . . ," Journal of Polymer Science: Part B: Polymer Physics, vol. 42, 2004, pp. 2821-2832.
Villalobos et al., "Oligomeric chain extenders for economic reprocessing and recycling of condensation plastics," Energy, vol. 31, 2006, pp. 3227-3234.
Chinese Office Action and Search Report for Chinese Application No. 201410770722.5, dated Feb. 28, 2017.

* cited by examiner

Primary Examiner — Kuo-Liang Peng
(74) Attorney, Agent, or Firm — Birch, Stewart, Kolasch & Birch, LLP

(57) ABSTRACT

Disclosed is a thermoplastic polyester elastomer, which is formed by reacting 100 parts by weight of polyester and 0.01 to 2 parts by weight of an epoxy resin with two epoxy groups, wherein the polyester is formed by reacting a parts by mole of a hard-segment diol, b parts by mole of a soft-segment diol, and 1 part by mole of a diacid, wherein $1 \leq a \leq 3$ and $0.005 \leq b \leq 1.5$.

6 Claims, No Drawings

THERMOPLASTIC POLYESTER ELASTOMER AND METHOD FOR MANUFACTURING THE SAME

CROSS REFERENCE TO RELATED APPLICATIONS

The present application is based on, and claims priority from, Taiwan Application Serial Number 103138869, filed on Nov. 10, 2014, the disclosure of which is hereby incorporated by reference herein in its entirety.

TECHNICAL FIELD

The technical field relates to a thermoplastic polyester elastomer, and in particular it relates to the composition of the thermoplastic polyester elastomer and a method for manufacturing the same.

BACKGROUND

Thermoplastic polyester elastomer (TPEE) is a polymer material having an elasticity recovery property at room temperature, which is similar to that of conventional vulcanized rubber. In addition, the TPEE can be plasticized at a high temperature in a formation process utilizing general equipment. While the TPEE can be plasticized by heat, it is also called a thermoplastic elastomer. TPEE is a linear block copolymer of a crystalline hard-segment polyester such as polybutylene terephthalate (PBT)/polyethylene terephthalate (PET) and an amorphous soft-segment such as aliphatic polyester or polyether. The TPEE includes the following properties and process technologies: (1) high thermal resistance, high withstand load, and high elasticity recovery, (2) high alternating fatigue properties and toughness, (3) low-temperature flexibility being higher than that of thermoplastic polyurethane (TPU), and (4) high oil/drug/chemical solvent resistance. The TPEE has the following processing characteristics: it can be processed using standard equipment and skills for thermoplastic plastic, e.g. extrusion, injection, blow molding, or the like. Because the TPEE can be used to produce rubber products without vulcanization, it eliminates the vulcanization step, reduce the investment, lowers the energy consumed, simplifies the technology, shortens the work cycle, enhances production efficiency, and lowers the processing cost. The scraps of TPEE can be recycled to save on resources for environmental protection.

In general, the TPEE should simultaneously have a low melting index and a high crystallization temperature. The low melting index is equal to a high melting strength, and therefore the TPEE can easily be extruded, blow molded, and the like. The high crystallization temperature may shorten the time required for processing of the TPEE. Conventional TEPPs only have either a low melting index or a high crystallization temperature, but not both.

Accordingly, a novel monomer composition and/or a novel process for a TPEE simultaneously having low melting index and high crystallization temperature are called.

SUMMARY

One embodiment of the disclosure provides a thermoplastic polyester elastomer, being formed by: reacting 100 parts by weight of a polyester and 0.01 to 2 parts by weight of an epoxy resin with two epoxy groups, wherein the polyester is formed by reacting a parts by mole of a hard-segment diol, b parts by mole of a soft-segment diol, and 1 part by mole of a diacid, wherein $1 \leq a \leq 3$ and $0.005 \leq b \leq 1.5$.

One embodiment of the disclosure provides a method of forming a thermoplastic polyester elastomer, comprising: (a) reacting a parts by mole of a hard-segment diol, b parts by mole of a soft-segment diol, and 1 part by mole of a diacid to form a polyester, wherein $1 \leq a \leq 3$ and $0.005 \leq b \leq 1.5$; and (b) reacting 100 parts by weight of the polyester and 0.01 to 2 parts by weight of an epoxy resin with two epoxy groups to form a thermoplastic polyester elastomer.

A detailed description is given in the following embodiments.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details.

One embodiment of the disclosure provides a method of forming a thermoplastic polyester elastomer, including: (a) reacting a parts by mole of a hard-segment diol, b parts by mole of a soft-segment diol, and 1 part by mole of a diacid to form a polyester, wherein $1 \leq a \leq 3$ and $0.005 \leq b \leq 1.5$; and (b) reacting 100 parts by weight of the polyester and 0.01 to 2 parts by weight of an epoxy resin with two epoxy groups to form a thermoplastic polyester elastomer.

In one embodiment, the diacid can be terephthalic acid, dialkyl terephthalate such as dimethyl terephthalate, or a combination thereof. In one embodiment, the hard-segment diol can be ethylene glycol, butylene glycol, or a combination thereof. In one embodiment, the soft-segment diol can be polytetramethylene glycol with a number average molecular weight of 250 to 4000. A soft-segment diol with an overly high number average molecular weight will lower the polymerization of the thermoplastic polyester elastomer, such that the thermoplastic elastomer polyester has an insufficient mechanical strength. A soft-segment diol with an overly high number average molecular weight will overly lower the melting point of the thermoplastic polyester elastomer, such that the thermoplastic elastomer polyester has an insufficient mechanical strength. In step (a), an overly high parts by mole of a hard-segment diol will be distilled out, thereby increasing reaction byproducts. An overly high parts by mole of a hard-segment diol will lower the polymerization of the thermoplastic polyester elastomer, such that the thermoplastic elastomer polyester has an insufficient mechanical strength. In one embodiment, step (a) is performed at a temperature of 190° C. to 230° C. An overly low temperature in step (a) will lengthen the reaction period and lower the degree of polymerization of the thermoplastic polyester elastomer. An overly high temperature in step (a) will easily degrade the thermoplastic polyester elastomer and lower its mechanical strength. The molecular weight of the polyester formed in step (a) is determined by the molecular weight of the diacid, the diol, and the degree of polymerization of the diol and the diacid. In general, the polyester has a molecular weight of 200 to 5000. A polyester with an overly high molecular weight will make it so that the thermoplastic polyester elastomer is not easily formed by polymerization, and it will lower the degree of polymerization and mechanical strength of the thermoplastic polyester elastomer. A polyester with an overly low molecular weight will make it so that the hard-segment of the thermoplastic polyester elastomer is not easily crystallized, and it will lower the mechanical strength of the thermoplastic polyester elastomer.

A catalyst (such as tetra-n-butyl titanate, antimony trioxide, or a combination thereof), an antioxidant (such as hindered phenol, thioester, phosphite, or a combination thereof), or a combination thereof can be further added in step (a).

In step (b), an overly high amount of the epoxy resin with two epoxy groups will overly increase the viscosity of the thermoplastic polyester elastomer, such that the product processing is difficult. An overly low amount of the epoxy resin with two epoxy groups will overly reduce the melting strength of the thermoplastic polyester elastomer. In one embodiment, the epoxy resin with two epoxy groups can be bisphenol A diglycidyl ether epoxy resin, novolac epoxy resin, or a combination thereof. In one embodiment, the epoxy resin with two epoxy groups has a number average molecular weight of 300 to 5000. An epoxy resin with two epoxy groups having an overly low number average molecular weight will make it so that the thermoplastic polyester elastomer has a low crystallization temperature. An epoxy resin with two epoxy groups having an overly high number average molecular weight will make it so that the thermoplastic polyester elastomer has an insufficient melting strength. In one embodiment, step (b) is performed at a temperature of 230° C. to 260° C. An overly low temperature in step (b) will make it so that the thermoplastic polyester elastomer has a low degree of polymerization. An overly low temperature in step (b) will easily degrade the thermoplastic polyester elastomer and lower its mechanical strength. In step (b), the polyester can be further polymerized, and the carboxyl group or hydroxyl group of the polyester can be reacted with the epoxy groups of the epoxy resin with two epoxy groups during the polymerization. As such, the thermoplastic polyester elastomer is obtained by step (b). Note that if the diacid and the diol are directly heated to 230° C. to 260° C. to form the polyester, and the epoxy resin with two epoxy groups is then added to react with the polyester, the product thereof will not simultaneously own the low melting index and the high crystallization temperature as the thermoplastic polyester elastomer in the disclosure.

Below, exemplary embodiments will be described in detail so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Comparative Example 1

291 g of dimethyl terephthalate and 186 g of ethylene glycol were mixed, and then heated to 190° C. to 230° C. for 3 hours to be esterified to form a first polyester.

217 g of polytetramethylene glycol (commercially available from Aldrich, Mn~1000), 0.025 phr of catalyst tetra-n-butyl titanate, 0.02 phr of catalyst antimony trioxide, 0.22 phr of antioxidant CHEMNOX-1010 (commercially available from CHEMBRIDGE) were then added to the above first polyester, and heated to 230° C. to 260° C. and vacuumed for 3 hours to be polymerized to form a second polyester. The properties of the second polyester were then measured by several standards, such as tensile strength (ASTM D-638), tensile ratio (ASTM D-638), hardness (ASTM D2204-05), melting index (ASTM D 1238), crystallization temperature (ASTM D3418), and melting point (ASTM D3418), as tabulated in Table 1.

Comparative Example 2

Comparative Example 2 was similar to Comparative Example 1, and the difference in Comparative Example 2 was 0.2 phr of glycerol being added to the first polyester before vacuuming and heating the first polyester to form the second polyester. The other factors such as the amount and type of the dimethyl terephthalate, the ethylene glycol, the polytetramethylene glycol, the catalyst, and the antioxidant, the esterification temperature and period, the vacuumed polymerization temperature and period, and the measurement standards of the second polyester were similar to those of Comparative Example 1.

Comparative Example 3

Comparative Example 3 was similar to Comparative Example 1, and the difference in Comparative Example 3 was 0.3 phr of nucleating agent Na-32 (commercially available from Shanghai KeSu Macromolecule Functional Materials Co., Ltd) being added to the first polyester before vacuuming and heating the first polyester to form the second polyester. The other factors such as the amount and type of the dimethyl terephthalate, the ethylene glycol, the polytetramethylene glycol, the catalyst, and the antioxidant, the esterification temperature and period, the vacuumed polymerization temperature and period, and the measurement standards of the second polyester were similar to those of Comparative Example 1.

Example 1

291 g of dimethyl terephthalate, 186 g of ethylene glycol, 217 g of polytetramethylene glycol (commercially available from Aldrich, Mn~1000), 0.025 phr of catalyst tetra-n-butyl titanate, 0.02 phr of catalyst antimony trioxide, and 0.22 phr of antioxidant CHEMNOX-1010 (commercially available from CHEMBRIDGE) were mixed, and then heated to 190° C. to 230° C. for 3 hours to be esterified to form a polyester.

0.3 phr of epoxy resin with two epoxy groups Epikote 1009 (commercially available from Momentive) was then added to the polyester, and heated to 230° C. to 260° C. and vacuumed for 3 hours to be polymerized to form a thermoplastic polyester elastomer. As such, the carboxyl group or hydroxyl group of the polyester can be reacted with the epoxy groups of the epoxy resin with two epoxy groups during the polymerization. The measurement standards of the thermoplastic polyester elastomer were similar to those of Comparative Example 1.

Example 2

A polyester was prepared as Example 1. 0.3 phr of epoxy resin with two epoxy groups 828 (commercially available from Momentive) was then added to the polyester, and heated to 230° C. to 260° C. and vacuumed for 3 hours to be polymerized to form a thermoplastic polyester elastomer. As such, the carboxyl group or hydroxyl group of the polyester can be reacted with the epoxy groups of the epoxy resin with two epoxy groups during the polymerization. The measurement standards of the thermoplastic polyester elastomer were similar to those of Comparative Example 1.

Example 3

A polyester was prepared as Example 1. 0.3 phr of epoxy resin with two epoxy groups Epikote 1001 (commercially available from Momentive) was then added to the polyester, and heated to 230° C. to 260° C. and vacuumed for 3 hours to be polymerized to form a thermoplastic polyester elastomer. As such, the carboxyl group or hydroxyl group of the polyester can be reacted with the epoxy groups of the epoxy resin with two epoxy groups during the polymerization. The measurement standards of the thermoplastic polyester elastomer were similar to those of Comparative Example 1.

Example 4

A polyester was prepared as Example 1. 0.3 phr of epoxy resin with two epoxy groups Epikote 1004 (commercially available from Momentive) was then added to the polyester, and heated to 230° C. to 260° C. and vacuumed for 3 hours to be polymerized to form a thermoplastic polyester elastomer. As such, the carboxyl group or hydroxyl group of the polyester can be reacted with the epoxy groups of the epoxy resin with two epoxy groups during the polymerization. The measurement standards of the thermoplastic polyester elastomer were similar to those of Comparative Example 1.

Example 5

A polyester was prepared as Example 1. 0.3 phr of epoxy resin with two epoxy groups Epikote 1007 (commercially available from Momentive) was then added to the polyester, and heated to 230° C. to 260° C. and vacuumed for 3 hours to be polymerized to form a thermoplastic polyester elastomer. As such, the carboxyl group or hydroxyl group of the polyester can be reacted with the epoxy groups of the epoxy resin with two epoxy groups during the polymerization. The measurement standards of the thermoplastic polyester elastomer were similar to those of Comparative Example 1.

Comparative Example 4

194 g of dimethyl terephthalate, 180 g of 1,4-butylene glycol, 166 g of polytetramethylene glycol (commercially available from Aldrich, Mn~1000), 0.025 phr of catalyst tetra-n-butyl titanate, 0.02 phr of catalyst antimony trioxide, and 0.22 phr of antioxidant CHEMNOX-1010 (commercially available from CHEMBRIDGE) were mixed, and then heated to 190° C. to 230° C. for 3 hours to be esterified to form a first polyester.

The first polyester was then heated to 230° C. to 260° C. and vacuumed for 3 hours to be polymerized to form a second polyester. The measurement standards of the second polyester were similar to those of Comparative Example 1.

Comparative Example 5

Comparative Example 5 was similar to Comparative Example 4, and the difference in Comparative Example 5 was 0.2 phr of glycerol being added to the first polyester before vacuuming and heating the first polyester to form the second polyester. The other factors such as the amount and type of the dimethyl terephthalate, the 1,4-butylene glycol, the polytetramethylene glycol, the catalyst, and the antioxidant, the esterification temperature and period, the vacuumed polymerization temperature and period, and the measurement standards of the second polyester were similar to those of Comparative Example 4.

Example 6

A polyester was prepared as Comparative Example 4. 0.3 phr of epoxy resin with two epoxy groups Epikote 1009 (commercially available from Momentive) was then added to the polyester, and heated to 230° C. to 260° C. and vacuumed for 3 hours to be polymerized to form a thermoplastic polyester elastomer. As such, the carboxyl group or hydroxyl group of the polyester can be reacted with the epoxy groups of the epoxy resin with two epoxy groups during the polymerization. The measurement standards of the thermoplastic polyester elastomer were similar to those of Comparative Example 1.

TABLE 1

| | Comparative Example 1 | Comparative Example 2 | Comparative Example 3 | Example 1 | Example 2 | Example 3 | Example 4 | Example 5 |
|---|---|---|---|---|---|---|---|---|
| Dimethyl terephthalate (g) | 291 | 291 | 291 | 291 | 291 | 291 | 291 | 291 |
| Ethylene glycol (g) | 186 | 186 | 186 | 186 | 186 | 186 | 186 | 186 |
| Polytetramethylene glycol (g) | 217 | 217 | 217 | 217 | 217 | 217 | 217 | 217 |
| Tetra-n-butyl titanate (phr) | 0.025 | 0.025 | 0.025 | 0.025 | 0.025 | 0.025 | 0.025 | 0.025 |
| Antimony trioxide (phr) | 0.02 | 0.02 | 0.02 | 0.02 | 0.02 | 0.02 | 0.02 | 0.02 |
| Antioxidant (phr) | 0.22 | 0.22 | 0.22 | 0.22 | 0.22 | 0.22 | 0.22 | 0.22 |
| Glycerol (phr) | | 0.2 | | | | | | |
| Nucleating agent (Na-32) (phr) | | | 0.3 | | | | | |
| Epoxy resin (Epikote 1009) (phr) | | | | 0.3 | | | | |
| Epoxy resin (828) (phr) | | | | | 0.3 | | | |
| Epoxy resin (Epikote 1001) (phr) | | | | | | 0.3 | | |
| Epoxy resin (Epikote 1004) (phr) | | | | | | | 0.3 | |
| Epoxy resin (Epikote 1007) (phr) | | | | | | | | 0.3 |

TABLE 1-continued

|  | Comparative Example 1 | Comparative Example 2 | Comparative Example 3 | Example 1 | Example 2 | Example 3 | Example 4 | Example 5 |
|---|---|---|---|---|---|---|---|---|
| Tensile strength(kgf/cm$^2$) | 277 | 159 | 215 | 260 | 240 | 245 | 226 | 220 |
| Tensile ratio (%) | 635 | 176 | 517 | 532 | 556 | 372 | 464 | 412 |
| Hardness (Shore D) | 48 | 42 | 47 | 46 | 48 | 48 | 47 | 48 |
| Melting index (2.16 kg@230° C.) | >100 | 11.3 | >100 | 0.7 | 17.03 | 1.21 | 5.289 | 5.86 |
| Crystallization temperature (° C.) | 148.5 | 149.0 | 192.9 | 166.6 | 132.5 | 134.5 | 156.5 | 175.3 |
| Melting point (° C.) | 221.7 | 217.5 | 223.2 | 221.2 | 223.0 | 222.9 | 221.2 | 220 |

TABLE 2

|  | Comparative Example 4 | Comparative Example 5 | Comparative Example 6 |
|---|---|---|---|
| Dimethyl terephthalate (g) | 194 | 194 | 194 |
| 1,4-Butylene glycol(g) | 180 | 180 | 180 |
| Polytetramethylene glycol (g) | 166 | 166 | 166 |
| Tetra-n-butyl titanate (phr) | 0.025 | 0.025 | 0.025 |
| Antimony trioxide (phr) | 0.02 | 0.02 | 0.02 |
| Antioxidant (phr) | 0.22 | 0.22 | 0.22 |
| Glycerol (phr) | 0 | 0.2 | 0 |
| Epoxy resin (Epikote 1009) (phr) | 0 | 0 | 0.3 |
| Tensile strength (kgf/cm$^2$) | 309 | 245 | 263 |
| Tensile ratio (%) | 792 | 766 | 727 |
| Hardness (Shore D) | 47 | 45 | 47 |
| Melting index (2.16 kg@230° C.) | 37.37 | 32.7 | 7.45 |
| Crystallization temperature (° C.) | 144.0 | 144.2 | 153.3 |
| Melting point (° C.) | 193.8 | 192.8 | 193.2 |

As shown in Tables 1 and 2, if the epoxy resin with two epoxy groups was added before the ester polymerization, the thermoplastic polyester elastomer would have a lower melting index and a higher crystallization temperature.

It will be apparent to those skilled in the art that various modifications and variations can be made to the disclosed methods and materials. It is intended that the specification and examples be considered as exemplary only, with a true scope of the disclosure being indicated by the following claims and their equivalents.

What is claimed is:

1. A method of forming a thermoplastic polyester elastomer, comprising:
    (a) reacting a parts by mole of a hard-segment diol, b parts by mole of a soft-segment diol, and 1 part by mole of a diacid to form a polyester, wherein 1≤a≤3 and 0.005≤b≤1.5; and
    (b) simultaneously reacting 100 parts by weight of the polyester and 0.01 to 2 parts by weight of an epoxy resin with two epoxy groups under vacuum at 230° C. to 260° C. to form a thermoplastic polyester elastomer, wherein the hard-segment diol is ethylene glycol, butylene glycol, or a combination thereof, and the soft-segment diol is polytetramethylene glycol with a number average molecular weight of 250 to 4000,
    wherein the thermoplastic polyester elastomer has a melting index from 0.7 to 17.03 for a standard weight of 2.16 kg at 230° C.

2. The method as claimed in claim 1, wherein the diacid comprises terephthalic acid, dialkyl terephthalate, or a combination thereof.

3. The method as claimed in claim 1, wherein the polyester has a molecular weight of 200 to 5000.

4. The method as claimed in claim 1, wherein the epoxy resin with two epoxy groups comprises bisphenol A diglycidyl ether epoxy resin, novolac epoxy resin, or a combination thereof.

5. The method as claimed in claim 1, wherein the epoxy resin with two epoxy groups has a number average molecular weight of 300 to 5000.

6. The method as claimed in claim 1, wherein step (a) is performed at a temperature of 190° C. to 230° C.

* * * * *